United States Patent
Tuijn

(10) Patent No.: US 10,489,089 B2
(45) Date of Patent: Nov. 26, 2019

(54) SYSTEM AND METHOD FOR DRIVING AN OUTPUT DEVICE

(71) Applicant: AGFA NV, Mortsel (BE)

(72) Inventor: Chris Tuijn, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 16/312,342

(22) PCT Filed: Jun. 15, 2017

(86) PCT No.: PCT/EP2017/064710
§ 371 (c)(1),
(2) Date: Dec. 21, 2018

(87) PCT Pub. No.: WO2017/220433
PCT Pub. Date: Dec. 28, 2017

(65) Prior Publication Data
US 2019/0258429 A1    Aug. 22, 2019

(30) Foreign Application Priority Data
Jun. 22, 2016 (EP) .................................... 16175600

(51) Int. Cl.
*G06F 15/00* (2006.01)
*G06F 3/12* (2006.01)
*G06K 1/00* (2006.01)

(52) U.S. Cl.
CPC .......... *G06F 3/1206* (2013.01); *G06F 3/1208* (2013.01); *G06F 3/1243* (2013.01); *G06F 3/1254* (2013.01); *G06F 3/1297* (2013.01); *G06F 3/1246* (2013.01); *G06F 3/1288* (2013.01)

(58) Field of Classification Search
CPC .... G06F 3/1206; G06F 3/1208; G06F 3/1243; G06F 3/1254; G06F 3/1297; G06F 3/1246; G06F 3/1288
USPC ........................................ 358/1.15, 1.1, 1.13
See application file for complete search history.

(56) References Cited

U.S. PATENT DOCUMENTS

| | | | |
|---|---|---|---|
| 7,076,450 | B1 | 7/2006 | Lopez, Jr. |
| 7,536,306 | B2 | 5/2009 | Ogawa |
| 7,996,273 | B2 | 8/2011 | Roche |
| 9,292,230 | B2 | 3/2016 | Scheller |

(Continued)

FOREIGN PATENT DOCUMENTS

| | | |
|---|---|---|
| EP | 0 882 580 A2 | 12/1998 |
| EP | 1 184 779 A1 | 3/2002 |
| EP | 1 259 887 A1 | 11/2002 |

OTHER PUBLICATIONS

Official Communication issued in International Patent Application No. PCT/EP2017/064710, dated Jul. 13, 2017.

(Continued)

*Primary Examiner* — Douglas Q Tran
(74) *Attorney, Agent, or Firm* — Keating and Bennett, LLP

(57) ABSTRACT

A system and a method for driving an output device in which both product intent and production details are entered by a print producer on a submission portal. When a product definition is complete, the job is transferred to a prepress server where it is rendered which involves pre-flighting the job. In a next step, rendered color separations together with output device specific instructions are sent to a print server from where the job is printed.

8 Claims, 5 Drawing Sheets

(56) References Cited

U.S. PATENT DOCUMENTS

2003/0151768 A1* 8/2003 Iida ....................... G03G 21/02
358/1.15
2005/0052695 A1* 3/2005 Fukunaga .......... H04N 1/00132
358/1.15
2013/0016389 A1 1/2013 Robinson

OTHER PUBLICATIONS

CIP4 "JDF Specification Release 1.0", URL:http://xml.coverpages.org/JDFSpec1-200104.pdf, Apr. 10, 2001, 37 pages.

* cited by examiner

SYSTEM AND METHOD FOR DRIVING AN OUTPUT DEVICE

CROSS REFERENCE TO RELATED APPLICATIONS

This application is a 371 National Stage Application of PCT/EP2017/064710, filed Jun. 15, 2017. This application claims the benefit of European Application No. 16175600, filed Jun. 22, 2016, which is incorporated by reference herein in its entirety.

BACKGROUND OF THE INVENTION

1. Field of the Invention

The invention belongs to the technical field of an automated system and method for processing a print job and driving an output device. More specifically the invention belongs to the field of systems and methods that use a remote server in a networked environment (such as "the cloud") for processing print jobs.

2. Description of the Related Art

Internet based stores for ordering a printed product have been known since 1995. The company Vistaprint originally enabled a print buyer to design a business card using one out of a predetermined set of templates in combination with text fields that he could customize and edit. Later on this service was expanded and now includes the possibility to order not just business cards but also personalized stationary, gift cards, calendars, posters, flyers etc. Companies that offer similar services are Impress, Colleria, Iprint and Mimeo.

A typical web store is accessible by a customer through a front end. This is usually a web page that can be accessed using a web browser and that features fields to register a new user account or to enable a user to sign in. Once a user has been signed in, he can express the product he wishes to order from a list of predefined products. In a next step he can edit the customizable fields. In a final step he can verify and submit his order and move on to online payment for his order.

A typical web store has also a back end that is accessible only by the print producer. This back end enables the print producer to manage the print jobs that have been submitted. The print producer can render specific print jobs and send them to specific output devices and finishing equipment. Once a job has been printed and finished it is mailed to the print buyer.

The U.S. Pat. No. 7,076,450, having a priority date of 18 Jan. 2000 and assigned to Lopez Printing Inc, discloses "an internet based print order system specifically adapted for use in efficiently and cost-effectively supplying business cards, stationery products and the like to institutional and conglomerate users." According to this invention, "a user is enabled to select a company tailored product according to a predetermined profile. A processor interface is adapted to directly generate a pre-press product for automatically incorporating the predetermined profile into the finished tailored product."

The EP patent application EP1259887 having a priority date of 25 Jan. 2000 and assigned to Vistaprint USA, Inc discloses "a method comprising accumulating discrete print jobs electronically from respective customers, aggregating the discrete print jobs into aggregate print jobs, each of the aggregate print jobs being printable at one time on units of an integral print medium, and electronically distributing the aggregate print jobs to respective printers for printing."

The EP patent application EP1184779 having a priority date of 21 Feb. 2000 and assigned to Seiko Epson Corp. teaches that "a client connected to a network instructs a printer connected to the network to print data. A server connected to the network mediates between the client and the printer about the printing. The client specifies the print data and the printer to which the data is outputted and issues a printing request to the mediating system, which converts the format of the print data to a general format independent on the model of the printer and transfers it to the printer."

The U.S. Pat. No. 7,996,273 having a priority date of 21 Jul. 2000 and assigned to Hewlett-Packard Development Company, teaches "an on-line market place for print services in which the interests of a plurality of users of print services is balanced with the interests of a plurality of print service providers."

The U.S. Pat. No. 7,536,306 having a priority date of Sep. 27, 2001 and assigned to Canon Kabushiki Kaisha describes "a print control method, a print control apparatus, and a print control program for forming print orders to print service providers which provide an online print service via the Internet."

The U.S. Pat. No. 9,292,230 having a priority date of May 14, 2010 and assigned to Canon Europe NV describes "a print-management system that comprises a plurality of web-submission servers and a print server. Each web-submission server hosts a website configured to allow submission of print jobs to the print management system. The print server is configured to receive print jobs from the plurality of web-submission servers, process the print jobs, and send print jobs to at least one printer to be printed. The print management system is configured to add an identifier to each received print job to identify the web-submission server or website that received the print job. The print server is configured so that print jobs are processed based on the identifiers added to the print jobs."

The systems like the ones described in the above prior art suffer from a number of limitations.

They are essentially set up as single stores. If a print producer wishes to set up multiple stores, he has to set them up separately. This approach results in a redundancy of resources such as for example the prepress engines that drive the different printing devices. This redundancy also makes management and maintenance (such as upgrading) of the prepress engines more complex.

SUMMARY OF THE INVENTION

The limitations of the existing technology are resolved by a system and a method that are described below.

The new system and method supports multiple print stores on a single server. It is capable of using the same prepress engine for driving different output devices at multiple locations.

Further advantages will become clear during the explanation of the preferred embodiments.

DETAILED DESCRIPTION OF THE PREFERRED EMBODIMENTS

Representative Embodiment of the Invented System

Figure 1:
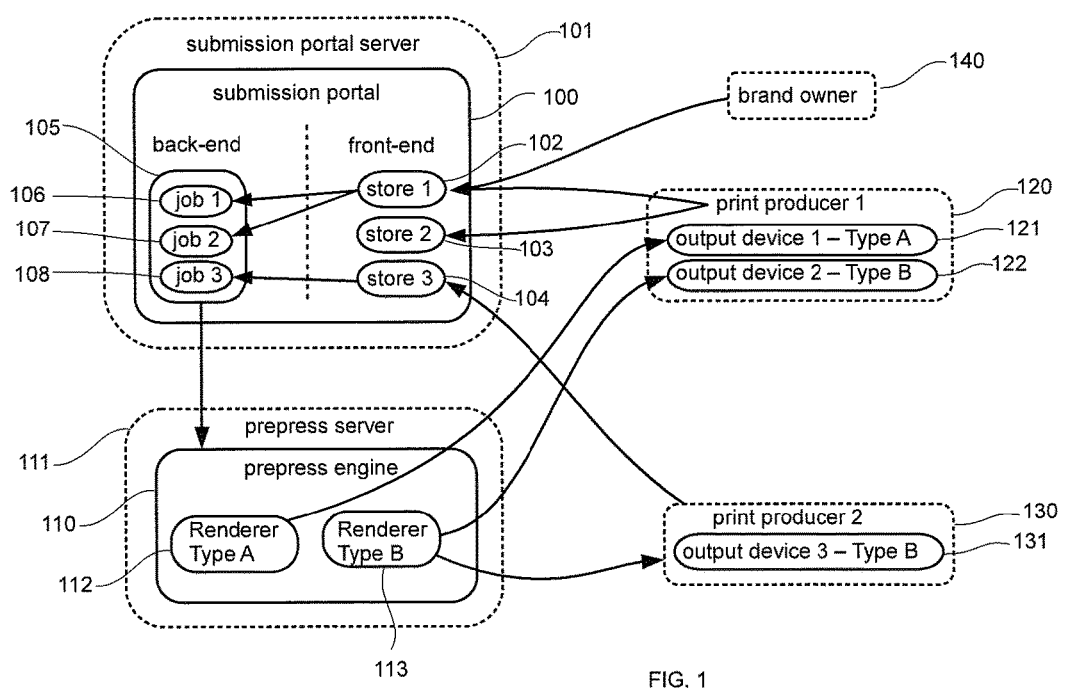
FIG. 1 shows a system according to the current invention comprising a submission portal server, a prepress server and three output devices.

FIG. 1 shows a global overview of a system according to the current invention.

100 is a submission portal that hosts multiple web stores (102, 103 and 104). The submission portal 100 is a software program that runs on a submission portal server (101).

Each of these web stores (102, 103 and 104) are individually accessible through a front end. The front end presents itself as a web page that is shown on a computer that is associated with a print producer. In FIG. 1 the web stores (102 and 103) are associated with a first print producer (120), whereas the web store (104) is associated with a second print producer (130).

In addition the web store (102) is optionally also accessible by a brand owner (140).

Each print producer (120, 130) has access to one or multiple output devices. In FIG. 1 print producer (120) manages two output devices (121 and 122). These output devices can be of the same or of a different type. For example, in FIG. 1 print producer (120) manages a first output device (121) of a first type A and a second output device (122) of a second type B. The second print producer (130) manages a single output device (131) that happens also to be of the type B.

Contrary to the print producers 120 and 122, a brand owner 140 is typically not associated with a specific output device.

Print producers can submit print jobs to the submission portal (100) through a web store. In FIG. 1 the print producer (121) has submitted two print jobs (106 and 107) through the web store (102). Similarly the print producer (130) has submitted a print job 108 through the web store (104).

Submitting a print job involves providing preferably at least information regarding:
the output device on which the job is to be printed;
the media type on which the job is to be printed;
the quality level with which the job is to be printed;
the number of items that are to be printed;
a content file describing the text and the images that are to be printed.

All the submitted data together define a print job (106, 107, 108). Multiple print jobs (106, 107, 108) together define a job list (105).

The submission portal comprises a first pre-flight engine. The job of such a pre-flight engine is to check if all the constraints are met to print a job on the selected type of output device and media, and to generate warnings or apply fixes in the case of non-conformity.

For the purpose of productivity, a print producer or a brand owner can make use of a product template in which some of the information is preset, while a number of variables and data can be edited.

The submission portal has a back end that preferably enables a submission portal operator to perform the following operations:
get an overview of the submitted jobs (106, 107, 108) in a job list (105);
manage the submitted jobs: previewing them, re-editing them, approving them, changing their order, deleting them etc.;
manage and design a product template;
do a number of administrative tasks such as the creation or the deletion of web stores, of print producer accounts, of manager accounts, etc.

A submission portal operator can be a print producer or the brand owner. These submission portal operators only get to see jobs created in the web stores that are associated with them. Alternatively, a submission portal operator can be a super user who has privileges to have access to all the jobs that have been submitted to the portal by the different front end users.

A job list (105) can be downloaded by a prepress engine (110). Such a prepress engine (110) is a software program that runs on a prepress server (111).

It comprises a scheduler for scheduling the order in which the jobs will be processed and rendered.

The prepress engine also preferably includes a second pre-flight engine.

Additionally, the prepress engine comprises one or more rendering engines. Each rendering engine is associated with a particular type of output device. For example in FIG. 1 there is a first rendering engine (112) that supports output devices of a type A and a second rendering engine (113) that supports output devices of a type B.

The output of a rendering engine is a set of files including a file that incorporates all the necessary instructions for an output device to print a job, a set of color separations of the image content and—optionally—a high quality preview image of the product that is to be printed.

All these files are mirrored to the site of the print producer for which it is meant. An output device prints the image content on the media according the printing instructions that come from the prepress engine.

Front End Operations

A representative embodiment of the invented system and method works as follows.

In a first step a print producer or brand owner gains access to the front end of the web submission portal by authenticating himself.

To define a printed product, he selects out of a set of available product types the one that most closely resembles his needs.

The product definition consists of two parts: a "product intent" part that describes how the printed product will look like and a "production data" part that provides information on how the printed product will be produced.

The product intent part is defined by a print producer or brand owner by uploading preferably a PDF, a JPEG or a PNG content file that is a complete representation of the content that is to be printed. Optionally the PDF file allows for fields that are filled in at a later stage of the production process. An example of such a field is a variable data field such as a "best consumed before" date field on a label suitable for packaging foodstuff. Another example is a unique serial number of the printed product.

An alternative solution of uploading a content file is to provide an editor that enables a print producer or brand owner to edit and lay out text and images or to enable him to provide a link to where a content file is located.

The production data part comprises at least the following sub-parts:

1) a sub-part that identifies the output device on which the printed product is to be produced;

2) a sub-part that identifies the media type on which the printed product is to be produced;

3) a sub-part that specifies the quality level that will be used to produce the printed product or parameters that correspond with a quality level such as printer resolution, raster frequency, the maximal total amount of ink coverage etc.;

4) a sub-part that specifies the printable area on which the product intent will be printed.

The sub-parts 1) through 3) are preferably multivalued options. The fourth sub-part is directly coupled with the selected type of print product.

When the print producer or brand owner has entered the product intent and the production data parts, a first pre-flighting takes place.

An important function of the pre-flighting on the submission portal is to check if the content file that is to be rendered fits along both the X- and Y dimensions in the trim box of the printable area of the selected print product type.

A second function is to check if the device dependent color coordinates of the content in the content file are sufficiently tagged to enable proper colorimetric interpretation during rendering at a later stage by the prepress engine.

According to one aspect of the invented system and method, it is possible to set a number of options for the (first) pre-flight engine, whereby a submission portal operator can select what action needs to be taken if it is detected that one or more of the conditions for printing a job on a selected output device is or are not met. These options can include:

generating a warning message for the operator,
aborting the submission process,
ignoring the warning altogether or
automatically making the necessary fixes to the data in order to meet the mandatory constraints.

In a next step, a print producer or brand owner can store the product specification under a given name. Later on he can reopen and edit the product specification or delete it.

At this point also a preview image may be generated of the printed product.

Every time that a print producer changes a print job, automatically a new pre-flighting takes place and a new preview image may be generated.

If the print producer or brand owner is satisfied with the product definition, he can submit it for production. From then on the product specification will continue to live on in the submission portal as a job.

The job comprises the content file and preferably a JDF ("Job Definition Format") job ticket.

The JDF framework is maintained by the CIP4 organization. A JDF job ticket is an open, extensible, XML-based specification of the complete workflow including all the production steps to create a printed product. The JDF job ticket in the current invention comprises the information regarding the production data part of the product specification, as well as administrative data regarding the web store and the print producer.

In a JDF job ticket, there is a provision for including proprietary XML formatted data. In the current invention this feature may be used to embed a "job XML file". Such a job XML file provides a vehicle to support proprietary instructions for driving a proprietary output device. By embedding a job XML file in the JDF ticket, it is possible to store at the level of the submission portal data that otherwise would not fit or belong in the JDF job ticket.

The JDF job ticket and the content file are optionally bundled in an ASCII encoded container file such as in a MIME file.

Back End Operations

A submission portal operator can inspect every job and approve it or delete it.

Approved jobs are transferred to the prepress engine.

Prepress Engine Operations

The role of the prepress engine is preferably:

1) To perform a (second) pre-flight of the content file that is incorporated in the JDF job ticket;

2) To render the job for a specific output device and to store the rendered images in a set of color separation files such as TIFF files;

3) To extract the job XML file from the JDF job ticket and to supplement its content in such a way that it provides complete instructions for printing the color separation files on the intended output device;

4) Optionally to generate a second preview image of the printed product.

The (second) pre-flighting of the JDF job ticket checks if all conditions are met for successfully rendering the content file on the renderer. This includes checking if all the resources such as fonts and color transformations are available, if the resolution of the images is sufficiently high, setting the width of hairlines, etc.

As mentioned before, the purpose of the job XML file is that it provides a mechanism and a vehicle to support proprietary instructions for driving a proprietary output device. The content of the job XML file typically includes preferably data such as administrative data: identification and contact data of the print producer and the customer;

a description of the printed product;

the number of pages in the content file that is to be printed;

data regarding to where the color separations are to be printed;

data regarding to the size of the color separations;

data regarding the media on which the image is to be printed, data regarding to the position size and orientation of the variable data field data regarding to the font type, size and color of the variable data field in the image;

data regarding to the file name and file size of the set of color separations.

These data are extracted by the prepress engine from the JDF job ticket that was earlier made on the submission portal.

The rendering process preferably involves converting vector graphics (including type) into bitmaps having the resolution of the intended output device, scaling contone images to the resolution of the intended output device, applying the necessary color conversions to obtain pixels represented in the same colorant space as the intended output device, and, finally, halftoning these pixels to match the pixel depth of the intended output device. In this way a set of color separations is obtained that are print ready for the intended output device. In a practical case, the color separations are preferably stored in TIFF or PNG files.

Print Server Operations

At this point all the data (a rendered set of color separations, a job XML file to drive the printer, and optionally the preview images) are available for starting the actual print production.

For this purpose said files are transferred from the prepress server to the print server that drives the intended output device. This can be done in a pull model whereby the operator of the print server initiates the transfer, or in a push model wherein the operator of the prepress server initiates the transfer.

When said data has been transferred to the print server, the actual printing can start. This involves parsing the job XML file and extracting the printer settings and printing the set of color separations in the TIFF files on the printed product.

At this stage the data for the variable data field (e.g. the "best consumed before" date) can be generated and merged with the empty space in the color separations.

INDUSTRIAL APPLICABILITY

A submission portal according to the current invention can be set up for printing on bottles.

The print producer in that case can be a brewery or a bottling plant. A brand owner could be the parent company of a brewery. The printed product could be a bottle on which a label is directly printed. The label can have fixed data such as text, a background image and a company logo and/or variable data. An example of variable data is a "best consumed before" date field that indicates the expiration date of the product inside a bottle.

Figure 2:
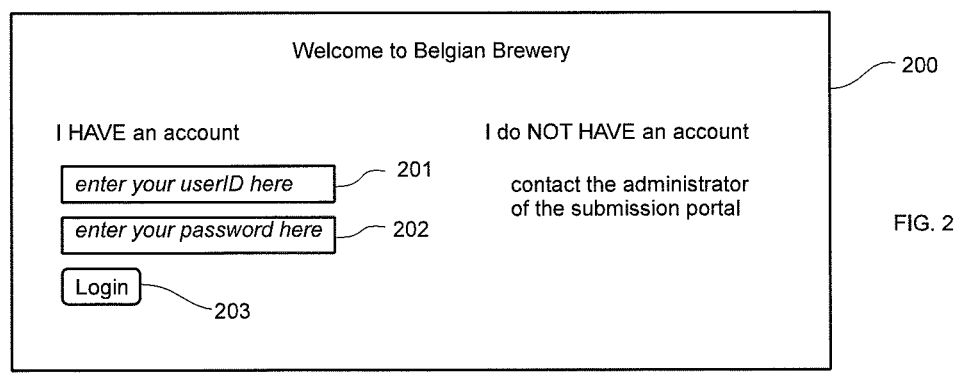
FIG. 2 shows a welcome screen of the front end of a submission portal.
Figure 3:
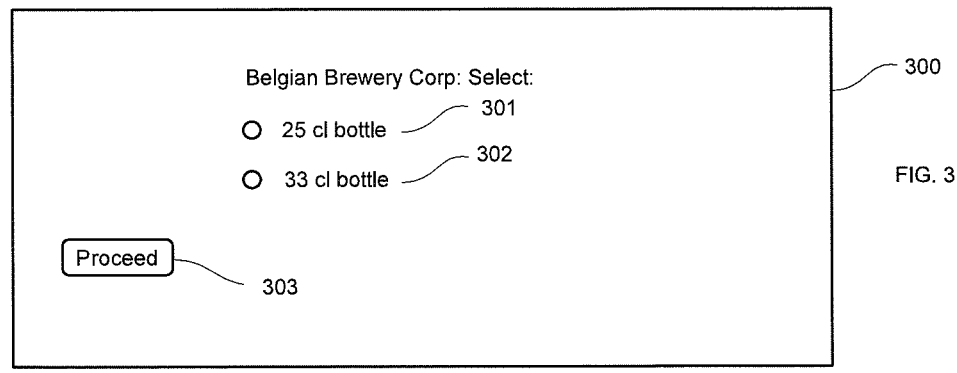
FIG. 3 shows a screen in which a print producer can select a printed product.

A print producer enters (FIG. 2) the submission portal by opening a window (200) and authenticating himself by means of a user name (201) and a password (202). The welcome screen (300) shows (FIG. 3) him a list of possible product types from which he can choose. For example, the available product types can be: a first bottle type (301) of 25 cl and a second bottle type (302) of 33 cl. When the print producer has made his choice, he selects a button "Proceed" (303) to move on to a next screen (400).

Figure 4:
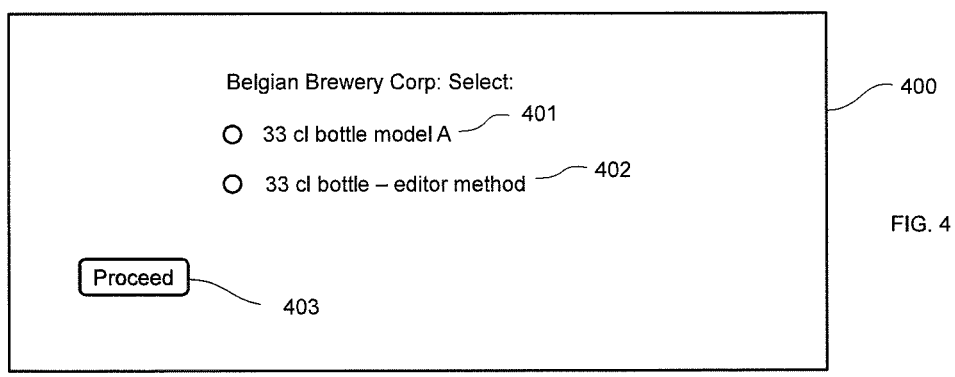
FIG. 4 shows a screen in which a print producer can select a method defining a product intent of a printed product.

The user then selects one of the available product types, for example the bottle type of 33 cl. He next sees (FIG. 4) a screen (400) in which he can select a method for specifying the printed product. In FIG. 4, for example, he can select between a method based on uploading a content file (401), or he can select a method that uses an online editor for defining the content (403). In this specific example it is assumed that the print producer has selected the "33 cl bottle model A" (401) which will require him at a later stage to upload a PDF or JPEG file for the content.

When the print producer selects the "Proceed" button (403), he is shown (FIG. 5) a screen (500) that gives him a number of options for producing the printed product. For example on the screen (500) the print producer is requested to enter:

- the number of bottles (501) that will be directly printed on such as e.g. 500;
- the material type of the bottle (502), such as e.g. transparent PET or green glass (selection by means of a drop down menu);
- the output device (503) that will be used to print on the bottles such as e.g. "Belgian Brewery—printer 2" (selection by means of a drop down menu);
- the quality mode options (504) such as e.g. Draft, Normal, or High (selection by means of a drop down menu).

Additionally, according to a specific embodiment of the invention, the print producer can specify in the production data part an offset distance with regard to a reference position on the bottle that is to be printed on, in order to define where the content image is to be printed on the bottle.

Figure 6:
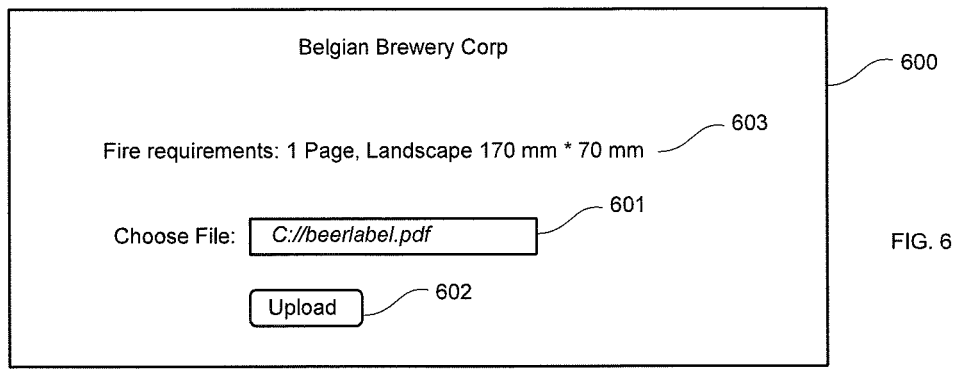
FIG. 6 shows a screen in which a print producer can upload a content file for a printed product.

After hitting the "Proceed" button (505), the print producer is invited (FIG. 6) to select (601) and upload (602) a PDF or JPEG file that that represents the label that is to be printed on the bottle.

The print producer is reminded of the constraints that the label should meet, e.g. that it should have specific sizes in both the height and width dimensions. An example (603) of such constraints is: "File Requirements: 1 Page, Media Size: 170 mm×70 mm, Landscape".

Figure 7:
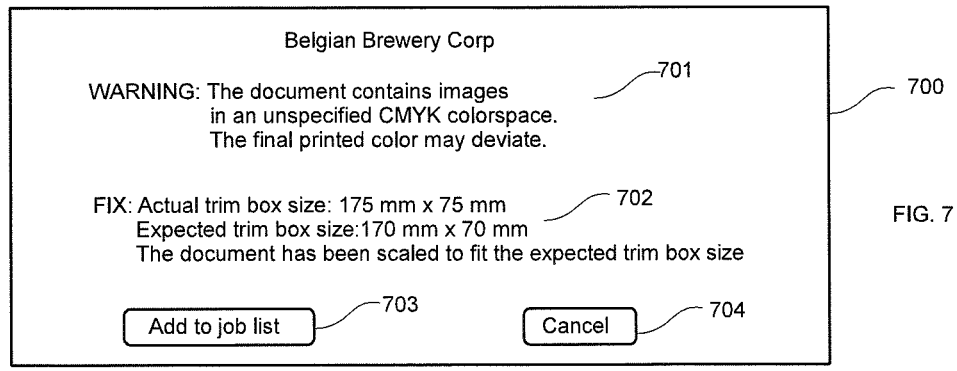
FIG. 7 shows a screen that is generated by a pre-flight engine.

At this point the first pre-flighting (FIG. 7) takes place. If certain issues where encountered, appropriate messages are generated. For example:

(701) WARNINGS: The file contains images in represented in a CMYK color space that is unspecified. The final printed color may be incorrect or there may be a color shift.

(702) FIXES:

Actual Trim Box Size is 175 mm×75 mm Landscape Expected Trim Box Size is 175 mm×70 mm, Landscape. The document has been scaled to fit the expected size.

SUMMARY: "While validating the document, warnings were encountered and some issues have been fixed. You may want to verify these fixes.

Click "Add to job List" (703) to continue with the uploaded file or click "Cancel" (704) to upload a revised file."

If the print producer clicks "Add to job list" (703), the pre-flighted job is effectively added to the job list (105).

According to a specific embodiment of the current invention, there is support for previewing the bottle with the label printed on it.

Optionally, there is a provision for a three-dimensional preview of the printed product. In that case anchors are provided in the preview pane to manipulate the viewing angle and orientation of the preview.

As mentioned before, the job may be stored in a JDF job ticket.

Figure 8:
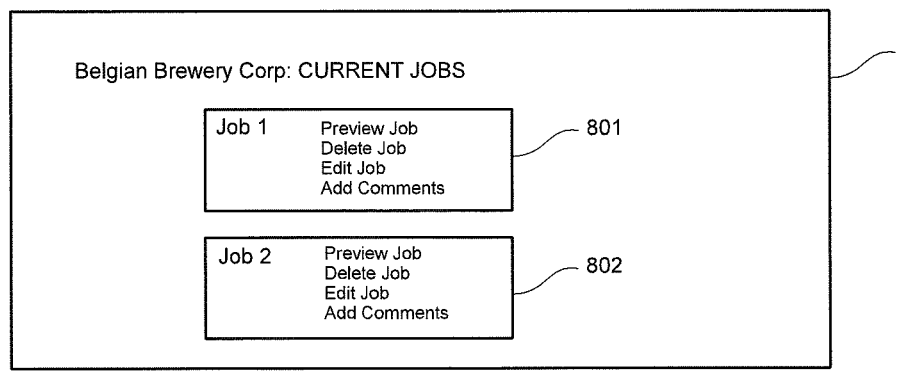
FIG. 8 shows a screen of the back of a submission portal in which two print jobs are shown.

At this stage, a print producer can view his job list (FIG. 8) through the back end screen (800) of the submission portal to preview, delete or edit existing jobs, or to add additional comments to a specific job. In FIG. 8 there are two jobs shown (801 and 802) that belong to the job list of a specific print producer.

When an existing job (801, 802) is edited or modified in any way, it is pre-flighted again before it is stored in a modified form in the job list.

A job list may be sent to a prepress server, or a prepress server may call the submission portal for uploading such a job list.

The first task of the prepress engine is to define a job schedule that determines in which order the different jobs belonging to the different job lists are to be processed.

When a specific job is processed, it is determined first from the JDF job ticket for which type of output device and media it is to be rendered and in which quality mode. From this information the appropriate parameters for the renderer can be selected: print resolution halftone frequency, color profile, GCR settings, maximum total ink etc.

Other information, such as the identification and contact data of the print producer, may be stored in a job XML file. In the same job XML file may also be stored all the information necessary to drive the output device, such as the selection of the type of bottle, a box defining the printable area, the position and orientation of the label etc. An example of a representative job XML file is shown at the end of this document.

The renderer then calculates printable bitmaps from a PDF, PNG or JPEG file that was uploaded. In a preferred embodiment these bitmaps may be stored in TIFF (or in another loss-less compressed format such as PNG) files. In a preferred embodiment the renderer is a PDF or PostScript based raster image processor. The printable bitmaps correspond with the color separations of the content that is to be printed. Optionally, high resolution preview images are generated of the complete printed bottle.

In a next step the color separations, the job XML file and the preview images are mirrored over a computer network to the print server at the location of the print producer where the intended output device resides. The job XML file is parsed to set up the printing parameters of the output device after which the color separations can be printed on the bottles.

It is at this stage that empty fields, if any, in the original content file are filled in. For example, a "best consumed before" date is generated and merged with the empty spaces that were left in the color separations during their rendering.

Additional Embodiments and Examples

The invention can be advantageously used for the production of directly printed bottles, but also for other objects such as mugs, drinking glasses, cans, dinner plates, cooking pots, etc. All these examples share the property that they are substantially axially symmetric objects.

Other examples for which the invention can be used are customized cardboard or paper packages, even canvases, towels, cushion covers, shoes, T-shirts, ties, etc. This list is not limitatif.

The printing by the output device is preferably done by means of an inkjet printer. If the object is axially symmetrical (e.g. a bottle), preferably a special printer is used that is specifically designed for this purpose such as the KHS-Innoprint® machine which is manufactured and marketed by the company KHS located in Dortmund (D). If the printing takes place on plastic objects (such as bottles) that are designed to contain fluids for human consumption, preferably UV-curable low migration inks are used such as marketed by the company Agfa Graphics N.V. located in Mortsel (B). An example of such an ink is disclosed in the European patent EP 2053103A having a priority date of 24 Nov. 2007 and assigned to the company Agfa Graphics N.V.

Total Area Coverage

A consideration when printing ink on plastic packaging materials that are designed to contain products for human consumption is the "total amount of ink coverage ("TAC").

A first reason to limit this TAC has to do with the printing process itself. A high value of the TAC may give rise to difficulties for curing the ink. Or it may result in cracking of the ink layer when the plastic object on which it is printed is deformed.

A second reason is health related. UV-curable inks contain monomer. During the curing, the monomer is transformed into polymer—but only to a certain extent. The monomer that remains after the UV-curing can migrate into the plastic packaging material and may ultimately even contaminate the liquid or the food that is inside the package. This risk can be managed by limiting the TAC. A lower TAC results in less monomer to begin with and also provides for deeper UV-curing thereby mitigating migration and contamination by the monomer.

A TAC may be expressed as the maximum sum of the individual amounts of inks, whereby each ink is expressed on a scale from 0% (no ink) to 100% (full coverage of the substrate by the ink). Alternatively another representative number may be used for expressing the TAC such as for example a number between (lowest TAC) and 10 (highest TAC).

Figure 5:
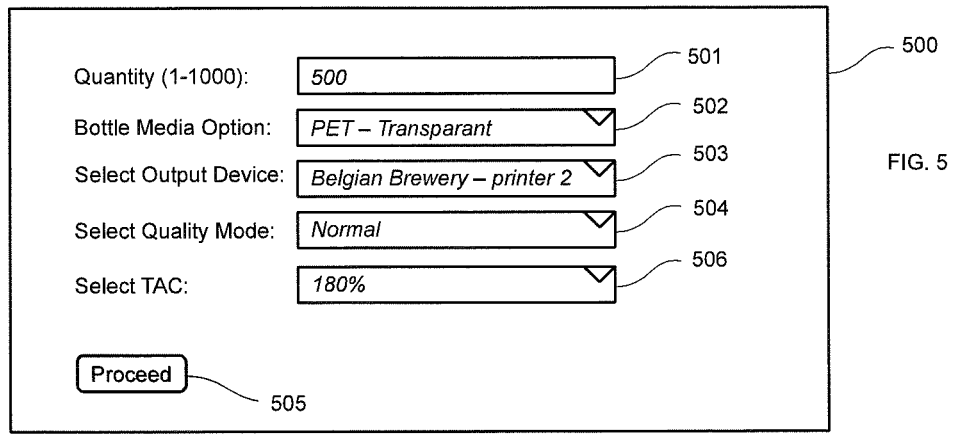
FIG. 5 shows a screen in which a print producer can enter production data for a printed product.

The TAC can optionally be specified by a print producer in a special field in the screen 500 in FIG. 5 and then becomes part of the production data part. The TAC specification is then used by the color management that takes place during the rendering.

Ink Consumption

There may be instances when a print producer wants to know an estimate of how much ink will be consumed to print a specific job. This information can be useful to calculate the cost of a job or to schedule a replenishment of the inks.

For that purpose, a specific embodiment of the current invention provides an option to calculate a prediction of the amount that will be used for each of the inks. The calculation is based on translating the color pixel values in the set of color separations taking into account the dot area compensation curves into volumes for each ink. The volumes can be expressed, for example, in ml.

The ink consumption estimates are preferably stored in the job XML file or—alternatively—in a separate XML or similarly structured data file.

Because the absolute values of the estimated ink volumes are not necessarily easy to interpret or even relevant, it is possible to have the estimated ink consumptions shown as a relative index on a ruler, whereby the left end of the ruler corresponds with a color separation that prints 0% of the area with ink, and a right end of the ruler with a color separation that prints 100% of the area with ink.

For estimating the ink consumption, it is not necessary to use the full resolution version of the color separations. A computationally more efficient approach is to render—with identical color rendering parameters—a low(-er) resolution version of the separations and to use these low(-er) resolution separations to estimate the amounts of ink consumption.

A user interface element is provided to activate the calculation of the ink consumption. and user interface elements are provided to call and show the results of the ink consumption estimates.

Multiple Page Content Files

There are instances when the different bottles that are to be printed in a job should not be associated with the same and identical content. It is possible, for example, to have a job in which 300 bottles are to be printed on, and whereby the first hundred of bottles receive a first content image, the second 100 bottles a second content image and the third hundred of bottles a third content image. Such an arrangement can be technically handled by working with content data that has multiple pages. When such a multiple page content is printed, it can further be specified in which order the different pages are to be printed: collated, not collated or—even—in a random sequence.

Alternative Embodiments Regarding the Job XML File

In the previous embodiments, an XML structured file, called the "Job XML file" is used as the vehicle to store proprietary instructions for driving a proprietary output device. In a wider context, other structured formats can be used than XML structured data, as long as they can be interpreted by the output device to print a set of separations with the correct output device settings. For that reason the term "job XML file" may be conveniently broadened to "job file".

In the previous embodiments, the Job XML file was embedded at the job submission portal in the JDF job ticket and at a later stage extracted from this JDF job ticket at the prepress server for supplementing it with additional information. In a slightly different method, there is no job XML file created and embedded at the job submission portal and embedded in a JDF job ticket but, rather the job XML file (or a file using another structured format) is being created on the prepress server where it is supplemented with information in such a way that it provides complete instructions for printing the color separation files on the intended output device.

Example of a job XML file
<JobFile>
<ID>Martens #30341</ID>
<Date>20150317</Date>
<Company>Belgian Brewery Corporation</Company>
<Store>Eurovision song contest</Store>
<Customer>
<Address Street="Mainstreet 1" PostalCode="1000" City="Brussel" Country="BE"/>
<Person NamePrefix=" " FamilyName="Ryan" FirstName="Chris" DescriptiveName="Chris Ryan">
<ComChannel ChannelType="Phone" ChannelTypeDetails="Landline" Locator="01 12 34 56"/>
<ComChannel ChannelType="Fax" Locator="01 12 34 56"/>
<ComChannel ChannelType="Email" Locator="chris@belgianbrewerycorp.net"/>
</Person>
</Customer>
<BottleType thumbnail="http://belgianbrewerycorp.net/id23423423">Mountain Dew 50 cl</BottleType>
<BottlePreview name="MountainDeww.png">
ABC . . . DKKDW3</BottlePreview>
<ImagePosition>85</ImagePosition>
<BottleDiameter>64</BottleDiameter>
<PrintableArea width="175" height="70"/>
<Media>Victoria—Transparent</Media>
<OutputDevice>Production Printer 2</OutputDevice>
<PrintMode>Normal</PrintMode>
<Count>500</Count>
<Pages>3</Pages>
<PageDetails>
<PageDetail id="1" percentage="50">
<BestBeforeDate resolution="72" x="283" y="487" width="60" height="203" rotation="270" font="Times-Bold" pointSize="18" red="0" green="255" blue="0"/>
<Separation filesize="100223">Cyan_1.tiff</Separation>
<Separation filesize="100423">>Magenta_1.tiff</Separation>
<Separation filesize="100523">>Yellow_1.tiff</Separation>
<Separation filesize="1003323">>Black_1.tiff</Separation>
<Separation filesize="1022223">>White_1.tiff</Separation>
<PagePreview>page1.jpg</PagePreview>
</PageDetail>
<PageDetail id="2" percentage="25">
<Separation filesize="200223">>Cyan_2.tiff</Separation>
<Separation filesize="300223">>Magenta_2.tiff</Separation>
<Separation filesize="400223">>Yellow_2.tiff</Separation>
<Separation filesize="5100223">>Black_2.tiff</Separation>
<Separation filesize="100223">>White_2.tiff</Separation>
<PagePreview>page2.jpg</PagePreview>
</PageDetail>
<PageDetail id="3" percentage="25">
<BestBeforeDate resolution="72" x="36" y="466" width="150" height="30" rotation="0" font="Garamond,Bold" pointSize="18" red="0" green="0" blue="0"/>
<Separation filesize="222">>Cyan_3.tiff</Separation>
<Separation filesize="33333">>Magenta_3.tiff</Separation>
<Separation filesize="4444">>Yellow_3.tiff</Separation>
<Separation filesize="1005223">>Black_3.tiff</Separation>
<Separation filesize="234344">>White_3.tiff</Separation>
<PagePreview>page3.jpg</PagePreview>
/PageDetail>
</PageDetails>
</JobFile>

The invention claimed is:

1. A method for driving an output device, the method comprising the steps of:
    entering on a submission portal server a product definition including a product intent portion defining a content of a print order and a production data portion defining instructions on how the print order is to be produced on the output device;
    storing the product intent portion in a content file;
    storing the production data portion in a JDF job ticket;
    embedding a job file in the JDF job ticket;
    pre-flighting the content file to check if all constraints are met for printing the content in the content file on the output device;
    transferring the JDF job ticket and the content file from the submission portal server to a pre-press server;
    rendering on a renderer on the pre-press server the content file according to the instructions in the production data portion in the JDF job ticket to obtain a set of color separations;
    supplementing the job file with output device specific instructions for printing the set of color separations on the output device; and
    transferring the set of color separations and the job file to a print server for printing the set of color separations on a product via the output device; wherein
    the product to be printed on is an axially symmetric object;
    the product intent portion includes an image that is to be printed;
    the production data portion includes:
        one or more features describing a material of the axially symmetric object;
        a type of the output device that will be used to print the image on the axially symmetric object; and
        a number of the axially symmetric objects that is to be printed on.

2. The method according to claim 1, wherein
    the product intent portion includes an empty field; and
    additional content data is generated on the print server to print in the empty field.

3. The method according to claim 1, wherein the production data portion includes an offset distance from a reference position on the axially symmetric object to define where the image is to be printed on the axially symmetric object.

4. The method according to claim 1, wherein the axially symmetric object is selected from the group consisting of a bottle, a mug, a drinking glass, a can, and a cooking pot.

5. The method according to claim 1, wherein the production data portion includes a total area coverage limitation.

6. The method according to claim 1, further comprising the step of:
calculating an estimated amount of ink consumption to print the set of color separations with the output device.

7. The method according to claim 5, wherein the output device includes an inkjet printer containing a UV-curable low migration ink.

8. A printed product prepared by:
performing the method according to claim 1; and
printing on the product.

* * * * *